(12) United States Patent
Laaksonen

(10) Patent No.: US 7,120,115 B1
(45) Date of Patent: Oct. 10, 2006

(54) ADMISSION CONTROL METHOD (75) Inventor: Niina Laaksonen, Espoo (FI)

(73) Assignee: Nokia Networks Oy, Nokia Group (FI)

( * ) Notice: Subject to any disclaimer, the term of this patent is extended or adjusted under 35 U.S.C. 154(b) by 0 days.

(21) Appl. No.: 09/787,308

(22) PCT Filed: Sep. 28, 1999

(86) PCT No.: PCT/FI99/00794

§ 371 (c)(1),
(2), (4) Date: Mar. 14, 2001

(87) PCT Pub. No.: WO00/19760

PCT Pub. Date: Apr. 6, 2000

(30) Foreign Application Priority Data

Sep. 29, 1998 (FI) .................................... 982091

(51) Int. Cl.
*H04L 12/26* (2006.01)
*H04Q 7/20* (2006.01)

(52) U.S. Cl. ................. 370/230; 370/235; 370/328; 455/453

(58) Field of Classification Search ............ 370/229, 370/238, 338, 230, 235, 328; 455/450, 425, 455/453; 375/377; 714/708
See application file for complete search history.

(56) References Cited

U.S. PATENT DOCUMENTS

| 5,497,504 A | 3/1996 | Acampora et al. ......... 455/33.2 |
| 5,666,348 A | 9/1997 | Thornberg et al. .......... 370/230 |
| 5,828,672 A * | 10/1998 | Labonte et al. ............. 714/708 |
| 5,974,106 A * | 10/1999 | Dupont et al. .............. 375/377 |
| 5,991,618 A * | 11/1999 | Hall ........................... 455/425 |
| 6,400,954 B1 * | 6/2002 | Khan et al. ................. 455/450 |
| 6,647,265 B1 * | 11/2003 | Olofsson et al. ............ 455/445 |
| 6,799,042 B1 * | 9/2004 | Kauhanen et al. .......... 455/450 |

FOREIGN PATENT DOCUMENTS

| DE | 41 34 476 C1 | 5/1993 |
| EP | 0 767 548 A2 | 4/1997 |

OTHER PUBLICATIONS

Huang et al, Call Admission in Power Controlled CDMA Systems, Dept of Electrical and Computer Engineering, pp. 1665-1669, 1996.
Liu et al, SIR-Based call Admission Control for DS-CDMA Cellular Systems, IEEE Journal on Selected Areas in Communication. Vo. 12, No. 4 May 1994, pp. 638-644.

* cited by examiner

*Primary Examiner*—Alpus H. Hsu
(74) *Attorney, Agent, or Firm*—Cohen, Pontani, Lieberman & Pavane (57) ABSTRACT

The invention is related to radio resource usage in cellular telecommunication systems, more accurately to admission control methods used in establishing of new connections. In a method according to the invention, a bearer request is checked with two different tests before it is admitted or rejected. A test of a first kind is used for overall control, i.e. all bearers are treated in a roughly similar way. A test of a second kind is used for controlling bearers, which present a high load to the network. A bearer request must then pass a combination of a test of the first kind and a test of the second kind in order to be admitted. A two-part test according to the invention is able to efficiently handle both even and skewed traffic.

9 Claims, 6 Drawing Sheets

ADMISSION CONTROL METHOD

PRIORITY CLAIM

This is a national stage of PCT application No. PCT/FI99/00794, filed on Sep. 28, 1999. Priority is claimed on patent application No. FI982091 filed in Finland on Sep. 29, 1998.

TECHNICAL FIELD OF THE INVENTION

The invention is related to radio resource usage in cellular telecommunication systems, more accurately to admission control methods used in establishing of new connections.

BACKGROUND OF THE INVENTION

In cellular telecommunication systems a single speech connection or data connection through the cellular telecommunication network is called a bearer. Generally, a bearer is associated with a set of parameters pertaining to data communication between a certain terminal equipment and a network element, such as a base station or an interworking unit (IWU) connecting the cellular network to another telecommunications network. The set of parameters associated with a bearer comprises typically for example data transmission speed, allowed delays, allowed bit error rate (BER), and the minimum and maximum values for these parameters. A bearer may further be a packet transmission bearer or a circuit switched bearer and support for example transparent or non-transparent connections. A bearer can be thought of as a data transmission path having the specified parameters connecting a certain mobile terminal and a certain network element for transmission of payload information. One bearer always connects only one mobile terminal to one network element. However, a bearer can pass through a number of network elements. One mobile communication means (ME, Mobile Equipment) may in some cellular telecommunication systems support one bearer only, in some other systems also more than one simultaneous bearers.

In order to be able to transmit information in a desired way, connections over the radio interface have to obtain a desired level of quality. The quality can be expressed for example as the C/I i.e. Carrier to Interference ratio, which indicates the ratio of received carrier wave power to received interfering power. Other measures for the quality of a connection are SIR i.e. Signal to Interference ratio, S/N i.e. Signal to Noise ratio, and S/(I+N) i.e. Signal to Noise plus Interference ratio. The bit error rate (BER) or frame error rate (FER) are also used as measures of connection quality. Typically, a certain target level for one of these or other corresponding measures is determined beforehand, and for each connection, the transmission power is adjusted to be such that the target level is reached as closely as possible. The transmission power should not be higher than what is necessary for obtaining the desired target level, since a too high transmission level wastes electrical energy in the transmitting equipment, which is crucial with handheld mobile stations, and causes interference to other connections.

Admission control is a crucial function in ensuring, that each bearer obtains the desired SIR level. The purpose of admission control is to examine each new request for a new bearer, and determine whether the requested service can be provided without degrading the service to other bearers, taking into account the transmission power of the requested bearer. If the new bearer can be serviced without harming other bearers, the request is admitted. Admission control typically co-operates with power control, whereby the transmission power of some of the other bearers may be adjusted in order to guarantee the SIR target level of the other bearers.

Various admission control algorithms have been proposed in the past. The article "SIR-Based Call Admission Control for DS-CDMA Cellular Systems" by Zhao Liu and Magda El Zarki, I2 Journal on selected areas in communications, vol. 12, no. 4, pp. 638–644, May 1994, describes an algorithm based on the concept of residual capacity. Residual capacity is defined as the additional number of initial calls a base station can accept. If the residual capacity is larger than zero, new calls are admitted. The residual capacity is determined from measured SIR levels and a treshold SIR level.

Another algorithms are described in the article "Call Admission in Power Controlled CDMA Systems" by Ching Yao Huang and Roy D. Yates, in proceedings of I2 VTS 46th Vehicular Technology Conference, Apr. 28–May 1, 1996, Atlanta, USA, pp. 1665–1669. In this article, two simple algorithms are presented. In the first algorithm, a new call is blocked when that new call would cause ongoing calls to transmit at maximum power. In the second algorithm, a new call is blocked if the total received power measured at the base station exceeds a predetermined treshold.

These algorithms function well, when the calls i.e. bearers are relatively similar in terms of resource usage, and any admission tresholds are set to a level where the admission of a bearer does not increase the load too near to the maximum capacity. However, these algorithms do not function well, when the bearers have widely varying properties, i.e. when the network needs to handle both low bit rate bearers such as normal speech bearers, and high bit rate bearers such as high-capacity data bearers or live video bearers. Such a variety of services will be provided for example by the UMTS cellular telecommunication system presently under development. For example, in the conventional algorithm in which a new call is allowed if the total received power measured at the base station is under a predetermined treshold, a high bit rate bearer may increase the network load too near to the maximum capacity. This can be prevented by lowering the treshold so that any high rate bearers allowed close to the treshold still do not increase the total load too much, but in that case, the low bit rate speech bearers end up being refused even if the remaining capacity could accommodate them.

The problem with the known admission control methods is, that they consider all bearers to have an evenly distributed bit rate usage, without regarding the differing properties of different bearers. This presents a problem in a situation, where there are bearers with widely differing characteristics within a control region, for example a large number of voice calls and a few real time video connections. A problem with high bit rate bearers is that even though the received total power in their control region is quite satisfactory, that control region may cause too much interference to some neighbouring control region because of the unequal distribution of the interfering power within it.

SUMMARY OF THE INVENTION

An object of the invention is to realize an admission control method, which takes into account differences between the resource usage of different bearers. A further object of the invention is to realize an admission control method, which provides efficient and widely adjustable control over admission of both bearers using small amounts of resources and bearers using large amounts of bearers.

The objects are reached by a two-part admission control method, in which a test of a first kind monitors all bearers in roughly the same way, and in which a test of a second kind monitors specifically bearers using large amounts of resources.

The method according to the invention is characterized by that, which is specified in the characterizing part of the independent method claim. The network element according to the invention is characterized by that, which is specified in the characterizing part of the independent claim directed to a network element. The dependent claims describe further advantageous embodiments of the invention.

In a method according to the invention, a bearer request is checked with two different tests before it is admitted or rejected. A test of a first kind is used for overall control, i.e. all bearers are treated in a roughly similar way. A test of a second kind is used for controlling bearers, which present a high load to the network. A bearer request must then pass a combination of a test of the first kind and a test of the second kind in order to be admitted. A two-part test according to the invention is able to efficiently handle both even and skewed traffic.

BRIEF DESCRIPTION OF THE DRAWINGS

The invention is described in more detail in the following with reference to the accompanying drawings, of which

Same reference numerals are used for similar entities in the figures.

DETAILED DESCRIPTION

First, let us define some terms. In the following specification, non-controllable traffic means that part of the traffic in a cellular telecommunications system, which the network is required to transmit. Non-controllable traffic comprises real time (RT) bearers and the traffic caused by the minimum bit rate requirement of non-real-time (NRT) bearers. Controllable traffic comprises such traffic, which the network may transmit or whose transmission the network may delay according to available capacity. Controllable traffic comprises mainly the part of the traffic caused by NRT bearers, which is above the minimum required bit rate. Preferably, non-controllable traffic is used as a basis of predictions since controllable load can be adjusted according to changing new situations. In the following specification, the term control region means a cell, a sector of a cell or any other area under active power and admission control by a single entity. Typically, a control region comprises a single cell, or in the case of sectored cells, a single sector of a cell. The term own control region refers to the control region under control of a controlling entity, i.e. the control region being controlled by a method according to the invention.

A method according to the invention comprises a two-part admission control test, which the bearer must pass in order to be admitted. The two parts comprise a test of a first kind, which treats the bearers in a similar way without regard to differences in resource usage between bearers, and a test of a second kind, which concentrates on bearers consuming a large amount of air interface resources.

The two tests of the two-part test according to the invention can be combined in more than one way. According to an advantageous embodiment described with the help of FIG. 1, the requested bearer must pass separately each of the two tests. According to a further advantageous embodiment described with the help of FIG. 2, the results of a test of the second kind are used to adjust the admission criteria of a test of the first kind, which the requested bearer must pass in order to be admitted. In other words, in some embodiments of the invention a test of the second kind does not directly decide whether a requested bearer is admitted or not, but affects the admission decision indirectly by adjusting the admission requirements of a test of the first kind.

Figure 1:
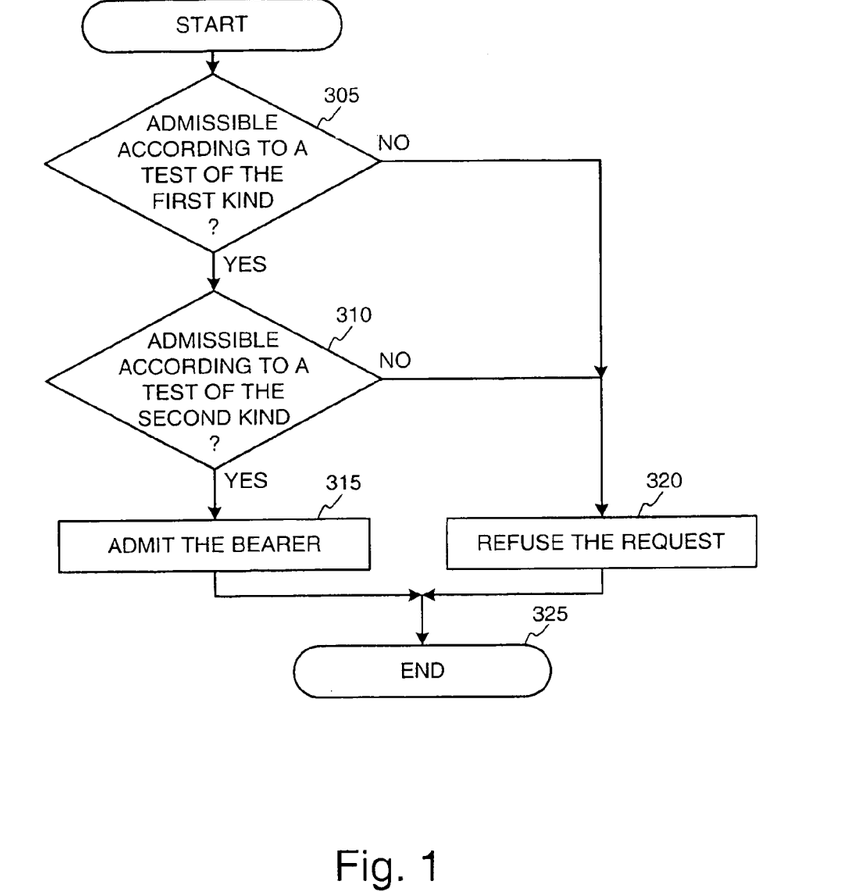
FIG. 1 illustrates a method according to an advantageous embodiment of the invention.

FIG. 1 illustrates a method according to an advantageous embodiment of the invention. This embodiment illustrates the functioning of a two-part admission control test applied to a bearer request received by a cellular telecommunications network. First, it is checked 305 whether the bearer request is admissible according to a test of the first kind. If the bearer request is not admissible, then the request is refused 320 and the test is ended 325. If the bearer request was found to be admissible according to a test of the first kind, it is checked in the next step 310 whether the bearer request is admissible according to a test of the second kind. If the bearer request is not admissible, then the request is refused 320 and the test is ended 325. If the bearer request is admissible, then the bearer is admitted 315 and the test is ended 325.

Figure 2:
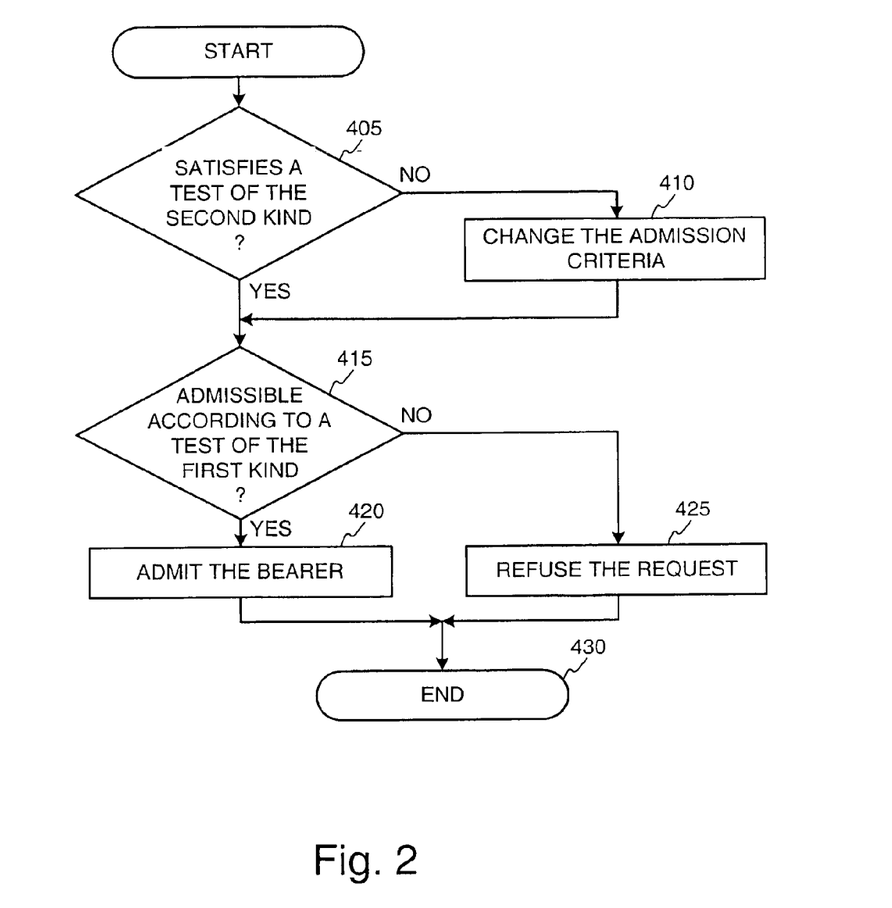
FIG. 2 illustrates a method according to another advantageous embodiment of the invention.

FIG. 2 illustrates a method according to a further advantageous embodiment of the invention. This embodiment illustrates the functioning of a two-part admission control test applied to a bearer request received by a cellular telecommunications network. First, it is checked 405 whether the bearer request satisfies a test of the second kind. If the bearer request satisfies the test, the method is continued at step 415. If the bearer request does not satisfy the test, admission criteria of the test of the first kind is changed 410, after which the method is continued at step 415. At step 415, it is checked whether the bearer request is admissible according to the test of the first kind. If the bearer request is not admissible, then the request is refused 420 and the test is ended 430. If the bearer request is admissible, then the bearer is admitted 425 and the test is ended 430.

In the following, examples of tests of the first kind are described, after which examples of tests of the second kind are described.

A. Examples of Tests of the First Kind

A.1. First Example of a Test of the First Kind

In this example, the load is defined as the total power received by the receiver of the controlling entity in the control region, such as the receiver of the base station of a cell. For the purposes of admission control, the load due to non-controllable traffic is observed:

$$\text{Load}\_UL = Prx\_dBm_{current} = 10 \cdot \log_{10}(Prx_{intra,nc}) \quad (1)$$

where $Prx_{intra,nc}$ is total received power of non-controllable traffic in the own control region. When a request to set up a new bearer is made, it is checked whether the load remains under a predetermined treshold, if the requested bearer is admitted. This can be performed by forming an estimate $Prx\_dBm_{pred}$ of the received power in the case the requested bearer is admitted:

$$Prx\_dBm_{pred} = Prx\_dBm_{current} + Prx\_dB_{inc} \quad (2)$$

where $Prx\_dB_{inc}$ is the estimated increase in the received power due to the new bearer. The estimate $Prx\_dBm_{pred}$ of the received power is compared to a treshold $Prx\_dBm_{th}$, and if the following inequality holds $$Prx\_dBm_{pred} < Prx\_dBm_{th} \quad (3)$$

the bearer is admitted. The received power of the new bearer i.e. the estimated increase $Prx\_dB_{inc}$ in the received power due to the new bearer depends on the bit rate and SIR target level of the bearer. A coefficient k from the load curve can be used to estimate the received power $Prx\_dB_{inc}$ in the following way:

$$Prx\_dB_{inc} = k \cdot \frac{SIR_{target}}{PG} \quad (4)$$

where PG is the processing gain. Obtaining of coefficient k is described in detail later in this specification.

Although equation (1) describes the calculations using dBm values, the invention is not limited to using dBm values. Therefore, the equations recited in this specification are only examples of feasible calculation methods, and do not limit the embodiments of the invention.

A.2. Second Example of a Test of the First Kind

The previous example can be enhanced by taking into account the effect of at least some of the neighboring control regions. This can be effected by introducing a neighboring control region term into the previous equations. The neighboring control region term preferably comprises both controllable and non-controllable traffic, since from the point of view of the own control region being controlled, neither of them can be changed. The predicted load in the considered control region i can be calculated with the equations $$Prx\_dBm_{current,i} = 10 \cdot \log_{10}(Prx_{intra,nc,i} + Prx_{other,all,i}) \quad (5)$$

$$Prx\_dBm_{total,pred,i} = Prx\_dBm_{current,i} + Prx\_dB_{inc} \quad (6)$$

where $Prx_{intra,nc,i}$ is the received power in the own control region due to non-controllable traffic in the region and $Prx_{other,all,i}$ is the received power in the control region due to traffic in other control regions. The term $Prx\_dB_{inc}$ in equation (6) can be estimated using equation (4). When using equations (5) and (6), the admission condition can be stated in the following way:

$$Prx\_dBm_{total,pred,i} < Prx\_dBm_{th} \quad (7)$$

A.3. Third Example of a Test of the First Kind

In a further advantageous embodiment of the invention, statistical properties of different bearers are taken into account. A requested bearer is not taken into account as a single bit rate value, but rather as a distribution of bit rates.

First, a distribution of bit rates is created for at least some services i.e. bearer types. This may be performed for example by observing, how much of the time a certain bearer uses a certain bit rate, and repeating this observation for all bit rates used by the bearer. The bit rate distribution of a service does not usually change very quickly, wherefore distributions need not be collected very often.

In the following step, the distributions of existing bearers are convoluted to obtain the combined distribution of already existing bearers.

As an example of convolution of two distributions, let us consider the case of a speech and a video bearer. In this example, we assume that the speech bearer has a data rate of 0 kbit/s half of the time and 16 kbit/s for the other half of the time, i.e. both rates having the same probability of 0.5. Let us also assume that the video bearer has the following data rates and associated probabilities:

| rate (kbit/s) | 64 | 128 | 192 | 256 | 320 | 384 |
|---|---|---|---|---|---|---|
| probability | 0.1 | 0.3 | 0.1 | 0.3 | 0.1 | 0.1 |

When these two distributions are convoluted, we obtain the following combined distribution:

| rate (kbit/s) | 64 | 80 | 128 | 144 | 192 | 208 | 256 | 272 | 320 | 336 | 384 | 400 |
|---|---|---|---|---|---|---|---|---|---|---|---|---|
| probability | 0.05 | 0.05 | 0.15 | 0.15 | 0.05 | 0.05 | 0.15 | 0.15 | 0.05 | 0.05 | 0.05 | 0.05 |

Any number of distributions may be combined by convolution in this way. Since convolution is a common mathematical tool and known by the man skilled in the art, calculation of convolutions is not describer in further detail here.

As in some of the previously described embodiments, the transmissions from at least some of the neighbouring control regions may be taken into consideration. These transmissions can advantageously be represented by a predefined default distribution in the calculation of the convolutions, which predefined default distribution can be scaled before the convolution operation in order to match the observed interference level. Noise parameters may also conveniently be included in the calculations in a similar way as the transmission from neighbouring control regions.

However, in some embodiments of the invention according to the third example of a test of the first kind, the effect of the other control regions may be left out of consideration in order to simplify the calculations.

In the following step, a distribution for the requested bearer is determined. This is advantageously performed by selecting from a predefined library of distributions, one distribution which corresponds most closely to the properties of the requested bearer. The predefined library may comprise one, two or more predefined distributions. Preferably, the library comprises several predefined distributions corresponding to most typical bearer types.

The distribution for the requested bearer may also be obtained by scaling a default distribution to match the requested bearer properties, in which case a single default distribution may be used for all cases, or a default distribution may be chosen from a library of default distributions.

In a further advantageous embodiment of the invention, the distribution of the requested bearer is obtained by interpolation from two library distributions, or by combining several library distributions.

After determination of the distribution of the requested bearer, the distribution is convoluted with the distribution of already existing bearers for obtaining a predicted distribution.

In the following step, it is checked if the predicted distribution is within the required limits. This may be performed in many different ways, depending on how the limits are specified and how a distribution of values can be determined to be within the limit or limits. For example, the checking may be effected in one of the following ways a) to d).

a) A cumulative sum of the predicted distribution is calculated, beginning from the lowest bit rate values. Cumulative sum is calculated until a certain predefined value is exceeded. The rate at which the predefined value is exceeded, is compared to a treshold value. If the rate is lower than the treshold, the bearer passes this test.

b) The predicted distribution is weighted by a constant multiplier or by a weighting distribution before calculation of the cumulative sum and comparing as in a).

c) The predicted distribution is processed in some other way, for example a predefined function may calculate a value which is compared to a treshold value. Different bit rates can be weighted differently by construction of the predefined function. The admission control can be adjusted in many ways by choosing a suitable predefined function for obtaining the intended purpose: for example, to prefer low bit rate bearers or to prefer high bit rate bearers, or give preference to bearers having a bit rate within a specified bit rate range in order to guarantee better service to a certain service or a group of services. The function may also be constructed in such a way as to produce such admission control criteria, that all bearers are given equal preference regardless of their resource usage.

d) The treshold can be expressed as a distribution, which is directly compared with the predicted distribution. For example, the bearer can be refused, if the predicted distribution is higher than the treshold distribution at some load value.

Such embodiments of the invention which consider the existing bearers as distributions have the additional advantage, that a temporary deviation of the bit rate of a bearer from the nominal value does not affect the determination of the load. For example, if the load presented by a bearer is determined at any single instant, it might not represent the average load the bearer presents. This problem can be avoided by expressing the load presented by a bearer as a distribution, which represents the actual load more accurately than a single measurement.

Figure 3:
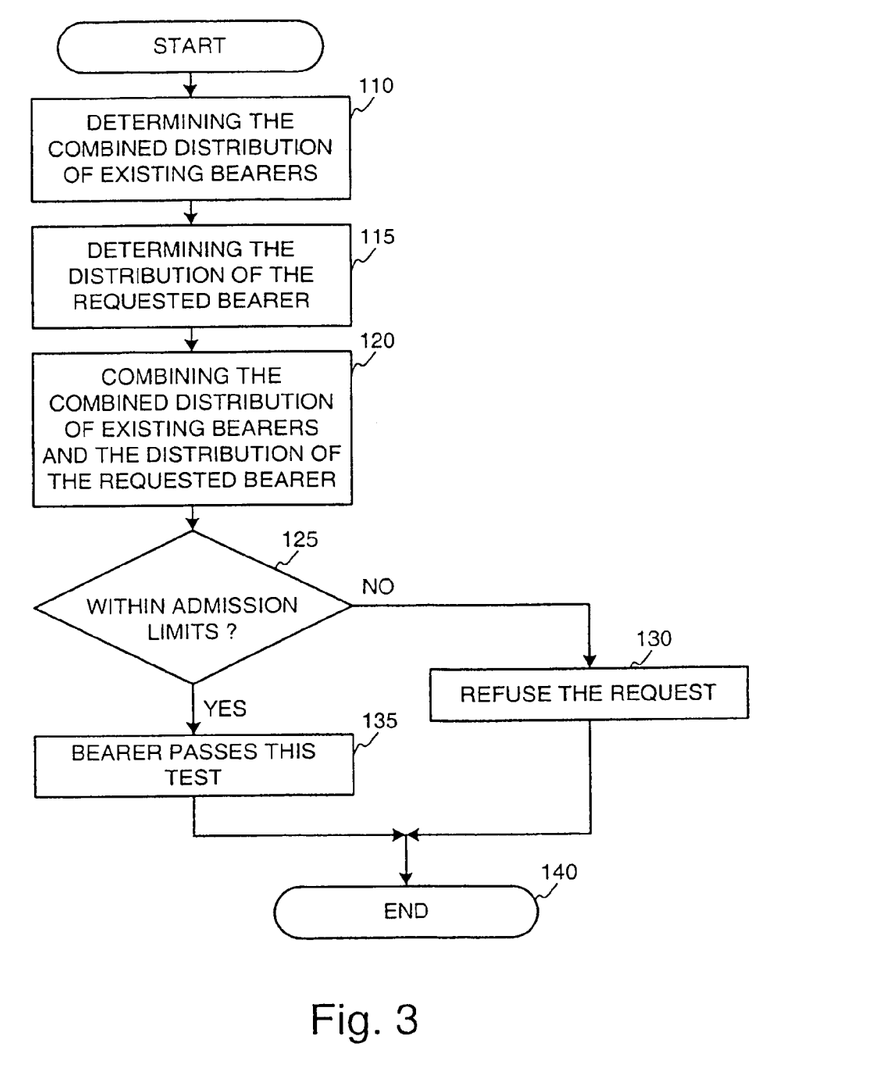
FIG. 3 illustrates an example of a test of the first kind according to an advantageous embodiment of the invention.

FIG. 3 illustrates a test according to the third example of a test of the first kind. First, the combined distribution of existing bearers is determined in step 110. The combined distribution may be determined for example by any of the previously described ways. In the next step 115, the distribution of the requested bearer is determined for example by selecting a distribution from a set of predefined distributions, which distribution has properties corresponding to the properties of the requested bearer. In the next step 120, the distribution of the requested bearer is combined with the distribution of all bearers to form a predicted distribution. If the predicted distribution is found to be outside the admission limits in step 125, the request is refused in step 130 and the test is ended 140. If the predicted distribution is found to be within the admission limits in step 125, the bearer passes 135 this test and the test is ended 140.

A.4. Fourth Example of a Test of the First Kind

In a further advantageous embodiment of the invention, the transmission power is taken into account when determining the load distributions. This gives a better representation of the actual load situation than only bit rate based distributions. The transmission power can be taken into account in several different ways, for example in one of the following ways:

A distribution may represent the distribution of the received power of a bearer.

A distribution may represent the distribution of received energy per bit of a bearer.

A distribution may represent the distribution of the bit rate of the bearer, weighted by the average energy per bit value of a bearer.

A distribution may represent the distribution of the bit rate of the bearer, weighted by the average energy per bit value of a bearer.

A distribution may represent the distribution of the bit rate of a bearer, weighted with the probability distribution of the received power of the bearer.

However, the invention is not limited to only these examples of ways of constructing distributions indicating at least in part a measure of transmitted energy.

Since the energy per bit values may be difficult to determine, an estimate of the average energy per bit value may be obtained for example from an estimate of the average transmission power of the bearer and the average bit rate of the bearer.

In other respects, the embodiments according to the fourth example of a test of the first kind may use the methods described previously with bit rate distributions according to the third example of a test of the first kind, by replacing the bit rate distributions with distributions according to the fourth example of a test of the first kind.

A.5. Fifth Example of a Test of the First Kind

The previously described third and fourth examples of a test of the first kind are computationally relatively intensive. To reduce the amount of calculations needed, the bearers can be treated in bearer groups to simplify the formation of the combined distribution of existing bearers. A bearer group is preferably a group of bearers having roughly similar BER requirement, i.e. roughly the same received energy per bit requirement. The bearers can also be grouped on the basis of the shape of their distributions.

The combined distribution of existing bearers can be determined for example as follows. First, the existing bearers are grouped to one or more bearer groups. Then, a distribution is determined for each group, preferably by selecting a distribution from a library of predefined distributions. Alternatively, certain bearer group types can be predefined, each with an associated predefined distribution. The distribution of each group is scaled to represent the total load represented by all of the bearers of the group. In the next step, the scaled group distributions are combined to form the combined distribution of existing bearers, preferably by convolving the distributions as described previously.

Next, the distribution of the requested bearer is determined. After that step, the predicted probability distribution is determined, which is preferably performed by combining the distribution of the requested bearer with the combined distribution of existing bearers.

Testing of whether the predicted distribution is within admission limits can be performed as described previously in the third example of a test of the first kind.

In a further embodiment according to the fifth example of a test of the first kind, the requested bearer is taken into account already before the combining of the group distributions. In such an embodiment, the requested bearer is taken into account by an additional scaling of the distribution of that bearer group, which most closely corresponds to the requested bearer. As a consequence, the result of the combining of group distributions is directly the predicted distribution.

Figure 4:
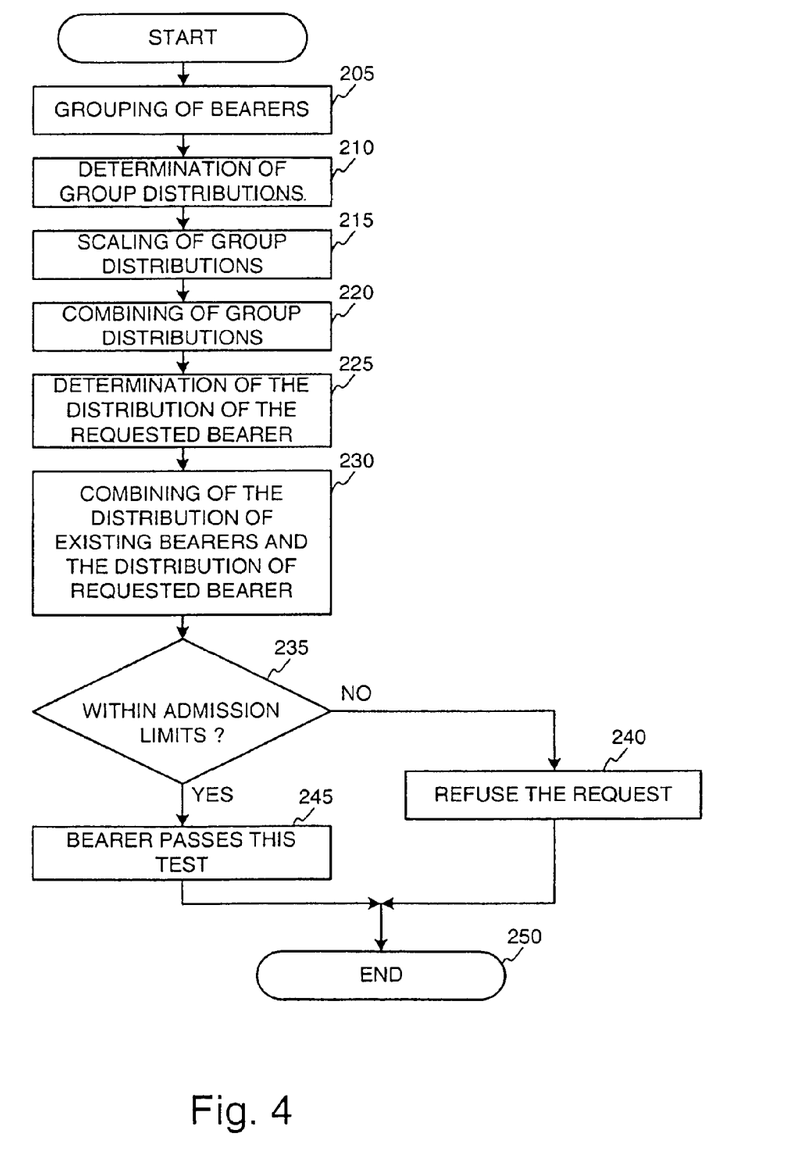
FIG. 4 illustrates another example of a test of the first kind according to an advantageous embodiment of the invention.

FIG. 4 illustrates a test according to the fifth example of a test of the first kind. In this example of an embodiment of the invention, the existing bearers are first grouped in bearer groups in step 205. In the next step 210, the distributions of the bearer groups are determined for example by selecting from a set of predefined distributions, after which each distribution is scaled in step 215 to match the load presented by the corresponding group of bearers. The scaled group distributions are combined in step 220 to obtain a combined distribution of existing bearers. In the next step 225, the distribution of the requested bearer is determined for example by selecting a distribution from a set of predefined distributions, which distribution has properties corresponding to the properties of the requested bearer. In the next step 230, the distribution of the requested bearer is combined with the distribution of all bearers to form a predicted distribution. If the predicted distribution is found to be outside the admission limits in step 235, the request is refused in step 240 and the test is ended 250. If the predicted distribution is found to be within the admission limits in step 235, the bearer passes 245 this test and the test is ended 250.

B. Examples of Tests of the Second Kind

The tests of the second kind concentrate on bearers, which require relatively large amounts of resources. Such bearers are denoted in the following by the term high load (HL) bearer. A bearer may be a HL bearer for example if the bit rate of the bearer is high, if the transmission power of the bearer is high, or the energy per transmitted bit $E_b$ is high. The tresholds determining if a bearer is a normal i.e. a low load bearer or a high load bearer may be defined in many different ways according to the needs of the particular implementation of the invention, and the invention is not limited to any specific such treshold or way of determining whether a bearer is a HL bearer or not.

Since the bit rate of a bearer is straightforward to monitor, the bit rate can advantageously be used for determining whether a bearer is a normal or a HL bearer. The bit rate treshold for the determination can be adjusted for example by experimenting with different values of the treshold and choosing the value producing the optimum performance of the network. The bit rate treshold may be different in different control regions. Further, in some embodiments of the invention the network may adjust the bit rate treshold in a control region according to the traffic situation.

In the following examples of tests of the second kind, the first four present tests of the second kind, which can be used in a method according to FIG. 1, and the rest present tests of the second kind, which can be used in a method according to FIG. 2.

B.1. First Example of a Test of the Second Kind

According to a further advantageous embodiment of the invention, problems created by a skewed load is alleviated by preventing the admission of too many high load bearers to one control region. The admission or rejection of HL bearers is in an advantageous embodiment of the invention performed simply on the basis of the number of HL bearers already active in a control region. A new bearer passes this test if the following inequality holds:

$$HL_i + HL_{new} \leq HL_{th1} \quad (8)$$

where
- $HL_i$ is the number of existing HL bearer in the control region i
- $HL_{new}$ is 1 if the new bearer is a HL bearer, otherwise 0, and
- $HL_{th1}$ is the predetermined maximum number of HL bearers in one control region.

The addition of 1 in equation (8) is not essential in various embodiments of the invention according to the first example of a test of the second kind. The test may simply be a comparison of $HL_i$ to a treshold, in which case only HL bearers are required to pass this comparison.

B.2. Second Example of a Test of the Second Kind

In a further advantageous embodiment of the invention, the previously described first example of a test of the second kind is enhanced by taking the neighbouring control regions into account as well. In such an embodiment, the admission condition can be for example the following:

$$\sum_{i=1}^{nearbyBSs} HL_i + HL_{new} \leq HL_{th2} \quad (9)$$

where $HL_{th2}$ is the maximum number of HL bearers within the own control region and the considered neighbouring control regions. The sum is calculated over a desired number of nearby control regions, for example all directly neighbouring control regions.

Figure 5:
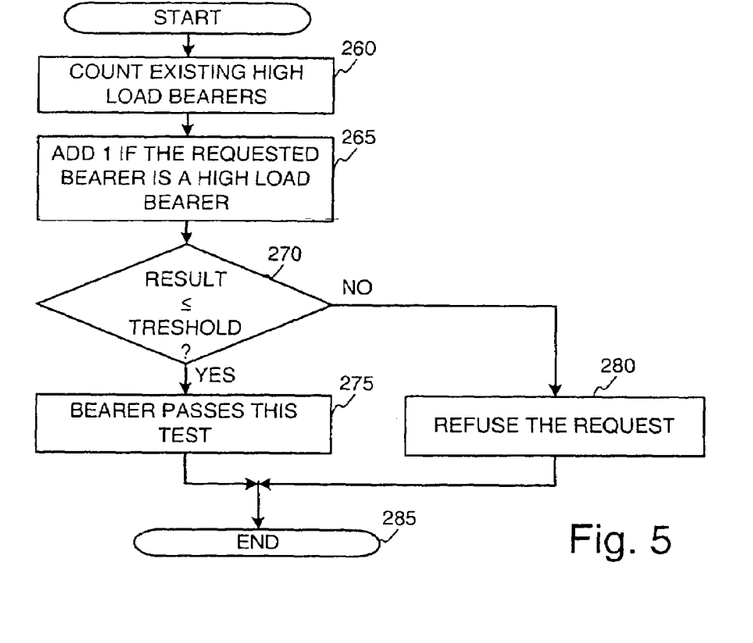
FIG. 5 illustrates an example of a test of the second kind according to an advantageous embodiment of the invention.

FIG. 5 illustrates a test according to the first or the second example of a test of the second kind. In FIG. 5, the existing high load bearers are counted in step 260. The counting may be done over the own control region as in the first example of a test of the second kind, or for example over the directly neighbouring control regions as in the second example of a test of the second kind. In the next step 265, the result is incremented by one, if the requested bearer is a high load bearer. In the next step 270 the result is compared to a predefined treshold value. If the result is larger than the treshold, the request is refused in step 280 and the test is ended. If the result is smaller than or equal to the treshold, the bearer is determined to pass 275 this test and the test is ended 285.

B.3. Third Example of a Test of the Second Kind

In a further advantageous embodiment of the invention, instead of the number of HL bearers as in equations (8) and (9), the admission condition can be based on the sum of bit rates of HL bearers in a control region or a group of control regions. This sum is then compared to a predefined treshold sum. If the predefined treshold sum is smaller than the sum of bit rates, the requested bearer is refused.

In a still further advantageous embodiment of the invention, the admission condition is based on the sum of bit rates of HL bearers as a percentage of total combined bit rate of all bearers within a control region or a group of control regions. This percentage sum is then compared to a predefined treshold percentage value. If the treshold value is smaller than the sum, the requested bearer is refused.

B.4. Fourth Example of a Test of the Second Kind

In a further advantageous embodiment of the invention, the admission condition can be based on the sum of transmission power of existing HL bearers in a control region or a group of control regions. The sum is compared to a predefined treshold value, and if the treshold value is smaller than the sum, the requested bearer is refused.

B.5. Fifth Example of a Test of the Second Kind

In a further advantageous embodiment of the invention, the result of a test of the second kind is used to control the admission treshold used in a test of the first kind.

This may be effected in many different ways, examples of which are presented in the following.

For example, the admission treshold may be changed by a predefined amount if one or more HL bearers already exist.

For example, the admission treshold may be changed by a predefined amount once for each HL bearer already existing.

For example, the sum of bit rates of HL bearers may be computed and the sum compared to a predefined maximum value, and the admission treshold may be changed according to the ratio of the sum to the predefined maximum value.

For example, the total transmission power of HL bearers may be determined and compared to a predetermined maximum value, and the admission treshold may be changed according to the ratio of the total transmission power and the predetermined maximum value.

However, the invention is not limited to these examples of ways, in which the admission treshold used in a test of the first kind can be changed according to the result of a test of the second kind. Other ways may be used in various embodiments of the invention. For example, in some embodiments of the invention the HL bearers in neighbouring control regions are taken into account.

B.6. Sixth Example of a Test of the Second Kind

In those embodiments of the invention, in which bearers are processed as distributions and a predicted distribution is obtained in the test of the first kind, the admission control adjustment may be effected in a wide variety of ways depending on how the predicted distribution is determined to be within admission criteria or outside the admission criteria. In such an embodiment the admission criteria can be adjusted uniformly for all bearers, or adjusted to be stricter to certain bearer types only. For example, the admission criteria can be adjusted to be stricter for new HL bearers while retaining the previous admission criteria for normal bearers.

Further, instead of adjusting the predefined admission limits, the processing of the predicted distribution can be adjusted for effecting the desired changes in admission requirements. For example, the predicted distribution can be weighted with a suitable distribution emphasizing the high bit rate values, which results in less resources being available to high load bearers. Further, if a predefined function calculates a value based on the predicted distribution, and this value is then compared to a predefined treshold for obtaining the admission decision, the function can be changed for effecting the desired changes in admission requirements.

C. Further Considerations

In various embodiments described previously, the estimated increase $Prx\_dB_{inc}$ in received power due to a new bearer is estimated with the help of a load curve. A load curve can be obtained as follows. It is generally known that SIR value $SIR_i$ of a bearer i may be calculated as $$SIR_i = PG_i \cdot \frac{Prx_i}{\sum_{\substack{J=1 \\ j \neq i}}^{N} Prx_j + P_a} \quad (10)$$

where $PG_i$ is the processing gain of the bearer, $Prx_i$ is the received power of the bearer i, the sum in the denominator is performed over the received power of other bearers, and the term $P_a$ denotes other interference sources and noise. From this follows $$\frac{SIR_i}{PG_i} = \frac{Prx_i}{\sum_{\substack{J=1 \\ j \neq i}}^{N} Prx_j + P_a} \quad (11)$$

Summing $SIR_i/PG_i$ over many bearers and allowing the number of bearers go to infinity, we obtain the limit $$\sum_{i=1}^{N} \frac{SIR_i}{PG_i} \xrightarrow{N \to \infty} 1 \quad (12)$$

Figure 6:
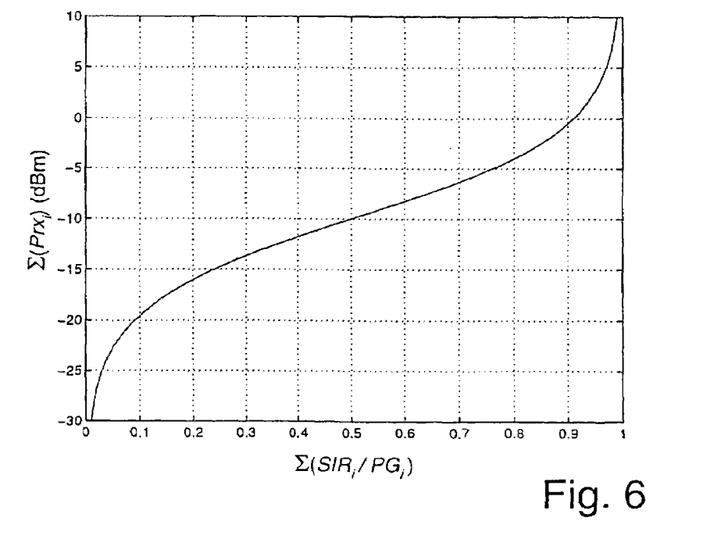
FIG. 6 illustrates an example of a load curve used in some embodiments of the invention.

A load curve can be obtained by plotting $\Sigma Prx_i$ as a function of $\Sigma(SIR_i/PG_i)$. An example of a load curve is given in FIG. 6. The load curve has an roughly linear portion in the middle. The coefficient k mentioned previously can be obtained from the load curve as the slope of a part of the roughly linear portion of the load curve. The coefficient k can also be found out by measuring the received total power level, i.e. $\Sigma Prx_i$, at different traffic situations with different numbers of active bearers i.e. at different values of $\Sigma(SIR_i/PG_i)$, and fitting a straight line into the measurement data. The slope of the line may then be used as the coefficient k.

The method according to the invention can be used as well in bearer negotiations i.e. if a first bearer request does not pass, a second bearer request with different parameters can be examined and so on, until admissible bearer parameters are found.

The method according to the invention can advantageously be used in a radio network controller (RNC) or other cellular telecommunications network element performing admission control. The method according to the invention can advantageously be applied in the UMTS cellular telecommunication system and other telecommunications systems at least partly based on the CDMA technology. The name of a given functional entity, such as the radio network controller, is often different in the context of different cellular telecommunication systems. For example, in the GSM system the functional entity corresponding to a radio network (RNC) is the base station controller (BSC).

D. Further Embodiments of the Invention

Figure 7:
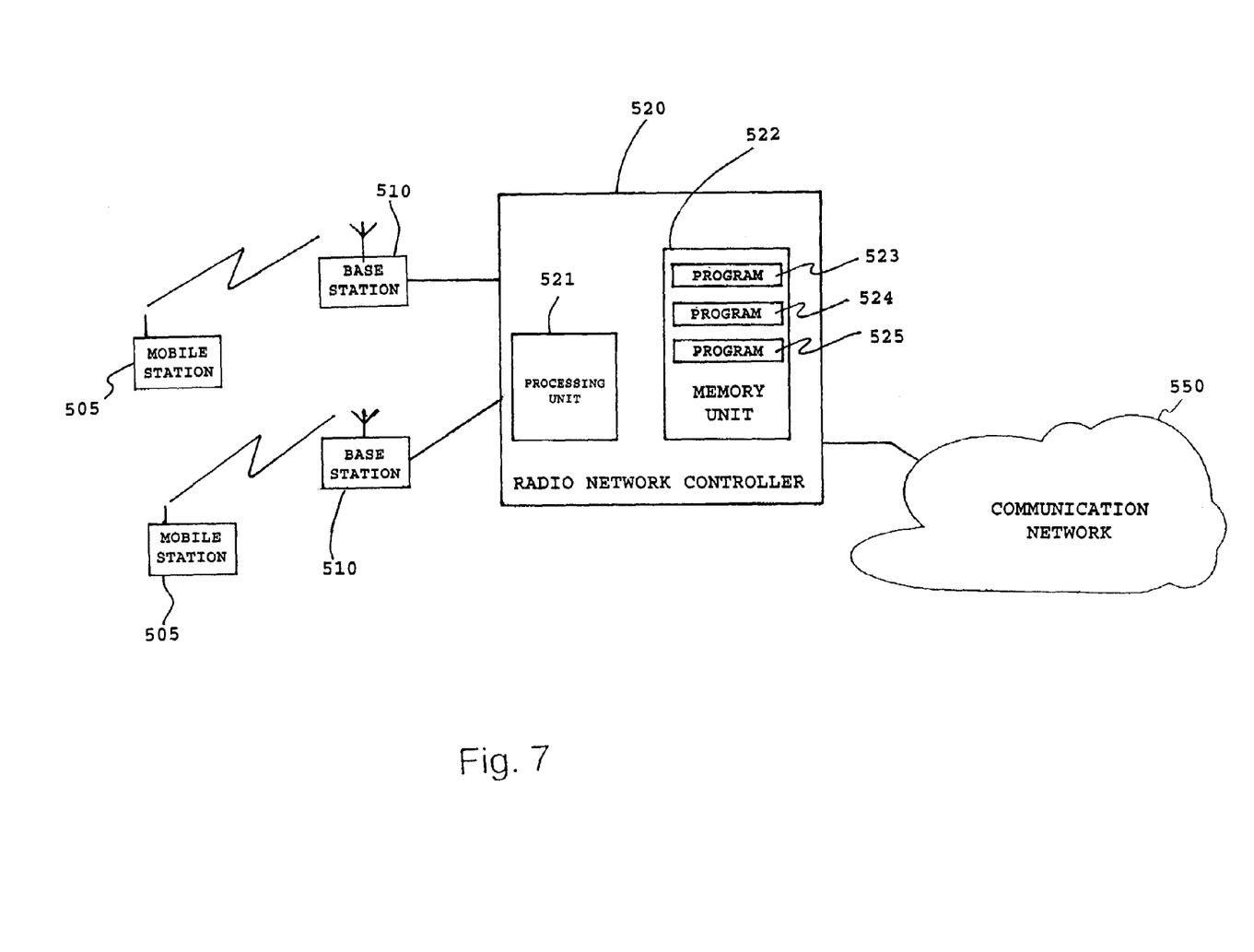
FIG. 7 illustrates further advantageous embodiments of the invention.

According to an advantageous embodiment, means for realizing the inventive method are incorporated in a network element of a telecommunications network. One example of such a network element is the radio network controller of a cellular telecommunications network. FIG. 7 illustrates one example of such an embodiment. FIG. 7 shows mobile stations 505 which are in radio connection with base stations 510. The base stations are connected to and controlled by a radio network controller 520, which is in turn connected to rest of the cellular telecommunications network 550. The cellular telecommunications network may, for example, be the UMTS cellular telecommunications network presently under development. According to this embodiment, the radio network controller comprises means 521, 522, 523 for testing a bearer request according to a test of a first kind and for producing a first test result, means 521, 522, 524 for testing a bearer request according to a test of a second kind and producing a second test result, and means 521, 522, 525 for deciding about admission of the bearer on the basis of said first and second test result. These means may be for example, a processing unit 521 such as a microprocessor 521 or a digital signal processor 521, a memory unit 522 comprising programs 523, 524, 524 executed by the processing unit 521 for performing the test of the first kind and test of the second kind and producing the admission or rejection decision based on the results of the tests for example according to the examples of methods recited previously.

The treshold values of admission conditions do not need to be permanently fixed values. The treshold values may be adjusted by the controlling entity of the control region or another element of the cellular telecommunications network in various embodiments of the invention, for example to optimize the resource usage of the network.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

The invention claimed is:

1. An admission control method for handling bearer requests in a cellular telecommunications network that supports bearers that are allowed to comprise controllable load components in addition to non-controllable load components, the method comprising the steps of:
   testing a bearer request with a first kind of test that sets same criteria; and
   testing said bearer request with a second kind of test;
   wherein said first kind of test monitors non-controllable load components, and said second kind of test monitors bearers that present to the network a non-controllable load component which exceeds a predefined threshold, and the admission of said bearer request to the network depends on results of both said first kind of test and said second kind of test.

2. The admission control method of claim 1, wherein said first kind of test is based on statistical properties of bearers.

3. The admission control method of claim 1, wherein during said second kind of test a number of currently existing high load bearers is compared to the predefined threshold.

4. The admission control method of claim 1, wherein during said second kind of test a sum of bit rates of currently existing high load bearers and of a requested bearer is compared to the predefined threshold.

5. The admission control method of claim 1, wherein an admission criteria of said second kind of test are changed according to the results of said second kind of test.

6. The admission control method of claim 5, wherein an admission threshold of said first kind of test is changed by a predefined step, if at least one high load bearer exists already.

7. The admission control method of claim 6, wherein the admission threshold of said first kind of test is changed by a second predefined step for each high load bearer existing already.

8. A network element for a cellular telecommunications network that supports bearers that are allowed to comprise controllable load components in addition to non-controllable load components, the element comprising:
   means for testing a bearer request based on a first kind of test that sets same criteria in a similar way for all bearer requests, and for producing a first test result, said means being adapted to handle requests for bearers that are allowed to comprise controllable and non-controllable load components, and said means being adapted to monitor non-controllable load components with said first kind of test;
   means for sequentially testing a bearer request with said first kind of test based on a second kind of test that monitors bearers that present to the network a non-controllable load component which exceeds a predefined threshold, and for producing a second test result; and
   means for deciding whether the bearer should be admitted to the network based on said first and second test results.

9. The network element for a cellular telecommunications network of claim 8, wherein the network element is a radio network controller.

* * * * *